(No Model.) 2 Sheets—Sheet 1.
D. M. DEARING.
WHEEL.
No. 595,610. Patented Dec. 14, 1897.
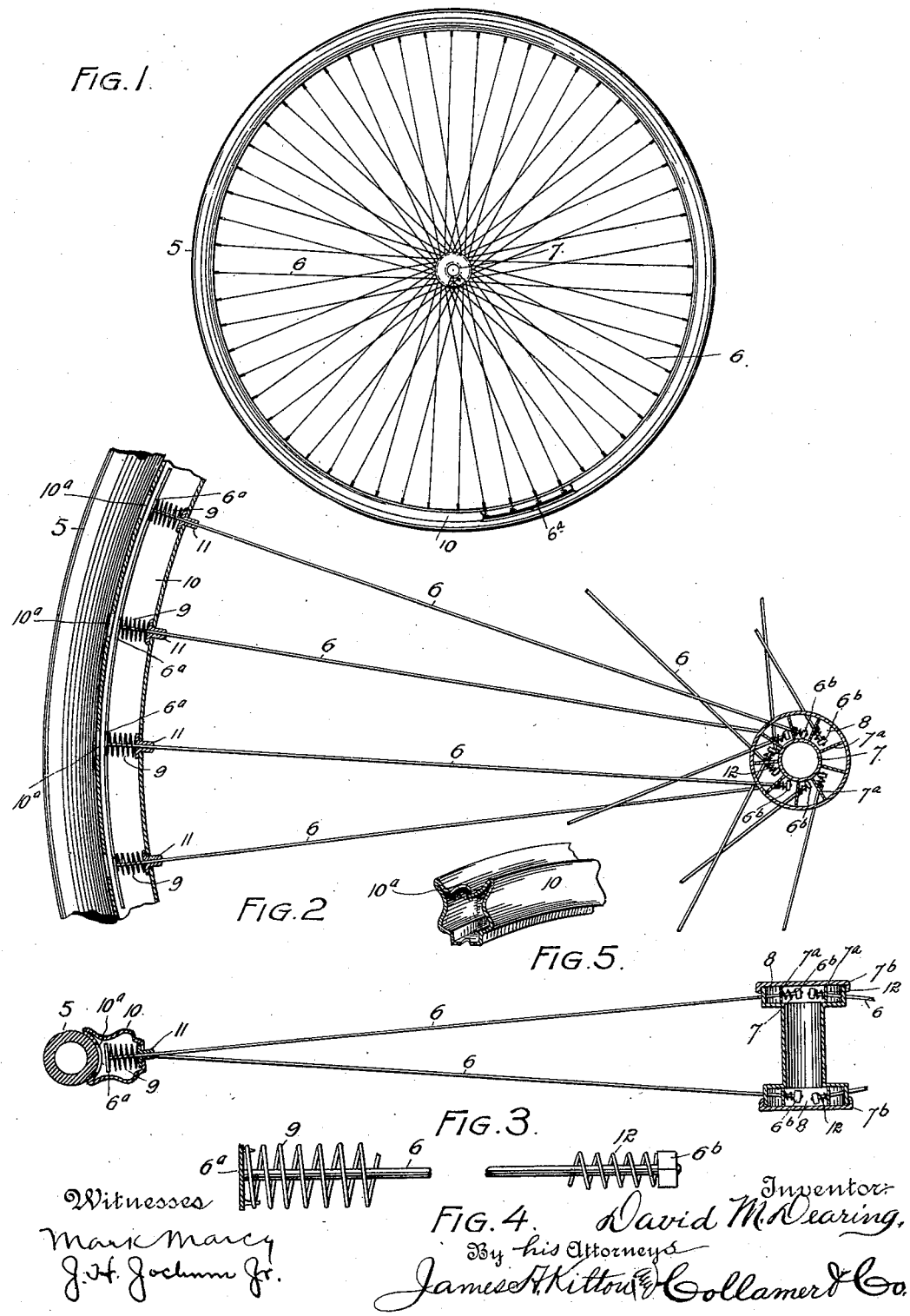
Witnesses
Mark Marcy
J. H. Jochum Jr.
Inventor:
David M. Dearing,
By his Attorneys
James A. Kittou & Collamer & Co.

(No Model.) 2 Sheets—Sheet 2.
D. M. DEARING.
WHEEL.
No. 595,610. Patented Dec. 14, 1897.
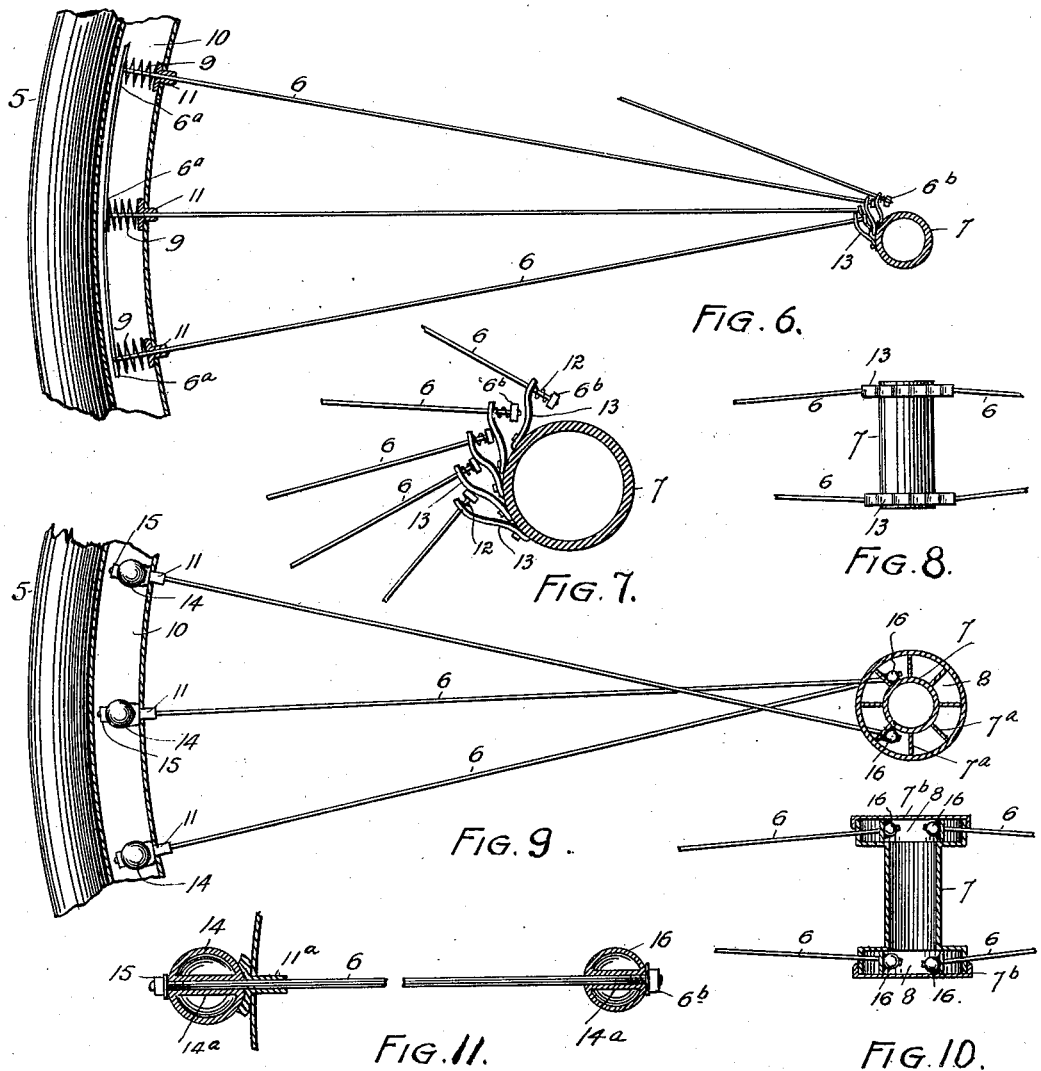

UNITED STATES PATENT OFFICE.

DAVID M. DEARING, OF JACKSON, MICHIGAN, ASSIGNOR OF ONE-HALF TO GUILFORD S. WOOD, OF DENVER, COLORADO.

WHEEL.

SPECIFICATION forming part of Letters Patent No. 595,610, dated December 14, 1897.

Application filed April 1, 1897. Serial No. 630,281. (No model.)

*To all whom it may concern:*

Be it known that I, DAVID M. DEARING, a citizen of the United States, and a resident of Jackson, Jackson county, State of Michigan, have invented certain new and useful Improvements in Wheels; and my preferred manner of carrying out the invention is set forth in the following full, clear, and exact description, terminating with claims particularly specifying the novelty.

This invention relates to wheels, and more especially to that class thereof known as "spring-wheels;" and the object of the same is to produce improved yielding connections between the spokes at the hub and at the rim ends thereof.

To this end the invention consists in the employment of a peculiar form of hub, a peculiar form of rim, and several different forms of springs interposed between the hub and the rim members and the spokes, all as hereinafter more fully described and claimed, and as illustrated in the accompanying drawings, wherein—

Figure 1 is a general view, in side elevation, of one form of my wheel. Fig. 2 is an enlarged sectional view of a segment of this wheel, and Fig. 3 is a still further enlarged cross-sectional view thereof. Fig. 4 is an enlarged detail of one of the spokes and its stops and springs. Fig. 5 is a perspective detail of a portion of the rim of the wheel. Fig. 6 is a sectional view of a segment of the wheel, illustrating a modification which may be adopted at the inner end of each spoke. Fig. 7 is a further enlarged cross-section through the hub used in this construction, and Fig. 8 is a plan view of such hub. Fig. 9 is a sectional view of a segment of a wheel constructed in accordance with another form of my invention. Fig. 10 is a longitudinal section through the hub usually employed with this form, and Fig. 11 is an enlarged longitudinal section of one of the spokes thereof.

The general object of my present invention is to produce a wheel wherein the spokes will have a yielding connection with the hub and with the rim, so that when the two latter parts separate the springs yield slightly at one or both ends of the spokes. The wheels illustrated are of the suspension type—*i. e.*, those wherein the hub is supported from the top of the rim by a direct pull on the upper spokes rather than from the bottom of the rim by a pushing action—and hence no provision will be necessary to prevent the approximation of the hub and rim. This object may be carried out in many different ways, of which I herein illustrate and describe several, and it may be accomplished with hubs, rims, and other members of a number of types, all of which are intended to be included herein in so far as the scope of the claims below will permit.

*The rim.*—This member 10 (see Fig. 5) is of the hollow type and comprises an inner plate pierced with fine holes for the reception or passage of the spokes 6 or for the reception of jacket-cones 11, having heads which stand within the body of the rim, an outer plate dished in cross-section, so as to receive the tire 5, and preferably provided with holes $10^a$ opposite those in the inner plate and of a size to permit the passage therethrough of the heads of said cones, and suitable side plates connecting the edges of the inner and outer plates, as will be clear.

*The hub.*—This member preferably comprises a tubular body 7, having enlarged ends or boxes 8, preferably closed by caps or the like, as at $7^b$, and within such boxes are located plates $7^a$, radial to the hub-body and forming compartments in its box-shaped ends, as in Figs. 2 and 9, and the rim of the box 8, as well as the plate, is pierced with fine holes for the passage of the spokes. The latter have stops or heads at their inner ends, (preferably in the form of nuts $6^b$, which when removed can be withdrawn from the boxes by removing the caps $7^b$ thereof,) and expansive springs are interposed between said stops and the plates of the hub—as, for instance, at 12—for the purpose of forcing said stops or nuts away from the plates and exerting a drawing action or tension on the spokes. One of the various modifications to which the construction of this hub is susceptible is shown in Figs. 6, 7, and 8, and consists in the omission of the so-called "boxes" 8 and the attachment of the plates directly to the tubular body 7 of the hub. While these plates might be radial, they are preferably tangential, and I have herein shown them of metal such as will yield partially, so that they become spring-plates 13. The spokes pass through them and have stops or heads $6^b$, and additional springs 12 may be here interposed between these stops and the plates, as above described.

*The spokes.*—These are of steel wire, as at 6, with stops at both extremities. One of the said stops may be a nut, as $6^b$, capable of removal, so that the spoke can be withdrawn, and the other, $6^a$, could be an integral head or plate of disk shape, as in Fig. 4, a continuous strip running around within the hollow rim, as in Figs. 2 and 7, or a nut, as at 15 in Figs. 9 and 11. It is only essential that the stops be larger than the springs through which the spoke-bodies pass, while it is highly desirable that provision be made at at least one end of the spoke for the removal of the stop in order to free the spoke and permit its withdrawal when necessary.

*The springs.*—In Fig. 4 is illustrated the spring 12, as of coiled wire, encircling the inner end of the spoke, and the larger and stronger spring 9, also here of coiled wire, encircling its outer end, and the location of these springs has already been described with reference to the other members. I make the inner spring smaller because there is less room for it adjacent the plates of the hub and for other reasons, among which I might add that it is preferable that the yielding take place mostly at the rim end of the spoke; but this is a matter of preference entirely. One of the various modifications to which the construction of these springs is susceptible (and here my preferred form of spring) is illustrated best in Fig. 12. It consists of a pneumatic ball 14, as of rubber, surrounding the spoke 6 between its stop and the plate, and if the latter be the inner rim-plate and a jacket-cone is employed, as above described, said cone $11^a$ is preferably made with a slightly cup-shaped head for the reception of the ball. The inner pneumatic spring 16 is here also shown smaller than the outer. In order to effectually prevent the escape of atmosphere from the interior of such ball, I preferably construct the same with a tubular core $14^a$, extending diametrically through the ball for the passage of the spoke therethrough, and the pneumatic chamber is of semicircular cross-section and extends around this core within the body of the ball itself. Obviously this form of spring is capable of substitution for the helical wire spring, and it is adapted to the same uses, all as above set forth, though possessing, in my opinion, greater advantages and producing a better wheel as a whole.

The various parts are of the desired sizes, shapes, proportions, and materials best adapted to the ends in view, and such changes may be made in details as are described herein or will be obvious to those skilled in the art, all without departing from the principle of my invention.

What is claimed as new is—

1. In a wheel, the combination with the hub, the rim having a plate, and jacket-cones through the latter; of the spokes connected with the hub and passing through the cones, stops at their outer extremities, and expansive springs between said stops and cones, as set forth.

2. In a wheel, the combination with the hub, the hollow rim having inner and outer plates pierced with registering apertures respectively small and large, and headed jacket-cones whose bodies fit the smaller apertures and whose heads may be passed through the larger ones only; of spokes leading from the hub through said cones, stops at their outer extremities within the rim, and expansive springs between the stops and the heads of the cones, as and for the purpose set forth.

3. In a wheel, the combination with the hollow rim having holes through its inner plate, and a stop consisting of a continuous strip inclosed within the hollow rim; of the hub, spokes leading therefrom loosely through the holes in the inner plate and connected with the stop, and expansive springs between the latter and the inner plate, as and for the purpose set forth.

4. In a wheel, the combination with the hollow rim having holes through its inner plate, jacket-cones seated in said holes, and a stop consisting of a continuous strip inclosed within the rim; of the hub, spokes leading therefrom loosely through said cones and connected with said stop, and expansive springs between the latter and the cones, as and for the purpose set forth.

5. The combination with one member, a jacket-cone seated therein and having a head with a cup-shaped face, a second member passing loosely through the cone, and a stop thereon; of a pneumatic ball resting in said cup and having a tubular core surrounding the second member between the cup and stop, as and for the purpose set forth.

6. In a wheel, the combination with the hub, the rim having a plate, and jacket-cones through the latter having cups in their outer ends; of the spokes leading from the hub and passing through the cones, stops at their outer extremities, and expansive springs consisting of pneumatic balls with diametric cores surrounding the spokes between said stops and cones and resting in the cups of the latter, as and for the purpose set forth.

7. In a wheel, the combination with the hub, the hollow rim having an inner plate pierced with apertures, and headed jacket-cones whose bodies fit the apertures and whose heads have cups in their outer faces; of spokes leading from the hub through the cones, stops at their outer extremities, and expansive springs consisting of pneumatic balls between the stops and the heads of the cones and resting in the cups of the latter, as set forth.

8. In a wheel, the combination with the rim, and the spokes; of a hub having radial plates through which the spokes pass obliquely, a stop at the inner extremity of each spoke, and a spring between the stop and plate, substantially as described.

9. In a wheel, the combination with the rim and spokes; of a tubular hub having enlarged box-shaped ends with interior radial plates, each spoke passing obliquely through the box and one of the plates and having a stop at its inner extremity, and a spring surrounding the spoke between the stop and plate, as and for the purpose set forth.

10. In a wheel, the combination with the rim, the spokes, a hub having enlarged tubular box-shaped ends closed at their outer extremities by caps, and radial plates within said boxes forming compartments, the spokes passing through such plates; of stops at the inner ends of the spokes, and expansive springs each within one compartment of the box-hub and embracing one spoke between its stop and the adjacent plate, as and for the purpose set forth.

11. In a wheel, the combination with the hub member having plates, and the rim member having a plate; of the spokes extending through the plates of said members, stops at the extremities of the spokes, and springs consisting of pneumatic balls surrounding the spokes at both ends between their stops and the adjacent plates, as and for the purpose set forth.

12. In a wheel, the combination with the rim, the spokes, a tubular hub having boxes at its ends containing fixed radial plates forming compartments therein, and caps closing the outer ends of such boxes and compartments; of nuts at the inner ends of the spokes, the bodies of the latter passing through both the rim of the boxes and the plates, and expansive springs surrounding the spokes between their nuts and the plates through which they pass, as and for the purpose set forth.

In testimony whereof I have hereunto subscribed my signature on this the 25th day of March, A. D. 1897.

DAVID M. DEARING.

Witnesses:
MARY HAMPTON LLOYD,
JOHN S. GIBONS.